US010209126B2

(12) United States Patent  (10) Patent No.: US 10,209,126 B2
Gao                              (45) Date of Patent:     Feb. 19, 2019

(54) ULTRAVIOLET RADIATION MONITORING APPARATUS, SYSTEM HAVING THE SAME, AND METHOD THEREOF

(71) Applicant: BOE TECHNOLOGY GROUP CO., LTD., Beijing (CN)

(72) Inventor: Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/986,133

(22) Filed: May 22, 2018

(65) Prior Publication Data

US 2018/0266880 A1    Sep. 20, 2018

Related U.S. Application Data

(63) Continuation of application No. 15/560,876, filed as application No. PCT/CN2017/080188 on Apr. 12, 2017, now Pat. No. 10,024,714.

(30) Foreign Application Priority Data

Apr. 28, 2016    (CN) .......................... 2016 1 0281328

(51) Int. Cl.
    *G01J 1/42*    (2006.01)
    *G01J 1/02*    (2006.01)
    *G01J 1/04*    (2006.01)

(52) U.S. Cl.
    CPC ............ *G01J 1/429* (2013.01); *G01J 1/0219* (2013.01); *G01J 1/0233* (2013.01);
    (Continued)

(58) Field of Classification Search
    CPC ...... G01J 1/0219; G01J 1/0233; G01J 1/0238; G01J 1/0403; G01J 1/429; G01J 2001/0261; G01J 2001/0276; G01J 2001/4266
    See application file for complete search history.

(56) References Cited

U.S. PATENT DOCUMENTS 8,699,020 B1 *  4/2014  Zhou ..................... G01J 3/0264
                                              356/301
9,008,389 B2 *  4/2015  Williams .............. G06T 7/0016
                                              382/128
(Continued)

FOREIGN PATENT DOCUMENTS

CN        200975920 Y      11/2007
CN        101257847 A       9/2008
(Continued)

OTHER PUBLICATIONS

International Search Report & Written Opinion dated Jun. 29, 2017 regarding PCT/CN2017/080188.
(Continued)

*Primary Examiner* — Mark R Gaworecki
(74) *Attorney, Agent, or Firm* — Intellectual Valley Law, P.C.

(57) ABSTRACT

The present application discloses a UV radiation monitoring apparatus, method, and system. The monitoring apparatus includes a case, an authenticator disposed on the case and configured to identify a user, a controller in the case coupled to the authenticator to enable a first mode for an authenticated user, a detector on the case coupled to the controller and configured to measure an intensity of ultraviolet radiation and generate ultraviolet index (UVI) value at the present time, a memory coupled to the controller and configured to store the UVI values over an exposure time added into historical UVI data for the authenticated user, and a display unit to display the UVI value at the present time and the personal health instructions on UV protection for the authenticated user. The monitoring apparatus further is configured to be paired with a mobile terminal for providing updated personal health instructions.

19 Claims, 4 Drawing Sheets

(52) U.S. Cl.
CPC ............ *G01J 1/0238* (2013.01); *G01J 1/0403* (2013.01); *G01J 1/42* (2013.01); *G01J 2001/0261* (2013.01); *G01J 2001/0276* (2013.01); *G01J 2001/4266* (2013.01)

(56) References Cited

U.S. PATENT DOCUMENTS

| | | | |
|---|---|---|---|
| 9,285,268 B2 * | 3/2016 | Aslam | G01J 1/0233 |
| 9,383,255 B2 * | 7/2016 | Lian | G01J 1/0403 |
| 9,551,611 B2 * | 1/2017 | Oliver | G01J 1/0219 |
| 9,662,062 B2 * | 5/2017 | De Guia | A61B 5/441 |
| 9,753,182 B1 * | 9/2017 | Bennouri | G01J 1/429 |
| 9,760,686 B2 * | 9/2017 | Garnavi | G06F 19/3431 |
| 9,798,458 B2 * | 10/2017 | Dumont | G01J 1/0271 |
| 9,880,052 B2 * | 1/2018 | Dumont | G01J 1/0271 |
| 9,927,294 B2 * | 3/2018 | Lian | G01J 1/44 |
| 2009/0001990 A1 | 1/2009 | Schmitkons et al. | |
| 2011/0191272 A1 * | 8/2011 | McGuire | G06N 5/00 706/11 |
| 2015/0177056 A1 | 6/2015 | Lian et al. | |
| 2015/0319294 A1 * | 11/2015 | Sudhir | H04M 1/72541 455/411 |
| 2016/0364131 A1 | 12/2016 | Dumont et al. | |

FOREIGN PATENT DOCUMENTS

| | | |
|---|---|---|
| CN | 101334317 A | 12/2008 |
| CN | 101645978 A | 2/2010 |
| CN | 102967363 A | 3/2013 |
| CN | 103868589 A | 6/2014 |
| CN | 204994767 U | 1/2016 |
| CN | 205898292 U | 1/2017 |

OTHER PUBLICATIONS

First Office Action in the Chinese Patent Application No. 201610281328.4, dated May 4, 2017; English translation attached.

Notice of Allowance in the U.S. Appl. No. 15/560,876, dated May 10, 2018.

* cited by examiner

ULTRAVIOLET RADIATION MONITORING APPARATUS, SYSTEM HAVING THE SAME, AND METHOD THEREOF

CROSS-REFERENCE TO RELATED APPLICATION

This application is a continuation of U.S. application Ser. No. 15/560,876 filed Apr. 12, 2017, which is a national stage application under 35 U.S.C. § 371 of International Application No. PCT/CN2017/080188 filed Apr. 12, 2017, which claims priority to Chinese Patent Application No. 201610281328.4, filed Apr. 28, 2016. Each of the forgoing applications is herein incorporated by reference in its entirety for all purposes.

TECHNICAL FIELD

The present invention relates to ultraviolet (UV) radiation monitoring technology, particularly to a UV monitoring apparatus, method, and system.

BACKGROUND

Solar light includes wavelengths in UV range that may cause human health issue. UV light with different ultraviolet index (UVI) affects human body differently. UV radiation with low UVI value causes much less damage to human body and people may be exposed by such UV radiation for a long time. But, UV radiation with high UVI value can cause high damage to human body and people needs to take certain UV protection procedures in order to be hurt due to long-time exposure. On the other hand, reasonable exposure of UV radiation with proper UVI value does provide benefit for human body to absorb Vitamin D, Calcium, Phosphorus or other elements that are good for human health.

SUMMARY

In one aspect, the present invention provides a monitoring apparatus for providing personal health instructions on ultraviolet (UV) radiation protection comprising a case; an authenticator on the case and configured to identify a user; a controller in the case coupled to the authenticator to enable a first mode for an authenticated user; a detector on the case coupled to the controller and configured to measure an intensity of ultraviolet radiation at a present time, the controller configured to convert the intensity to real-time ultraviolet index (UVI) value at the present time; a memory coupled to the controller and configured to store the real-time UVI values over a period of exposure time added into historical UVI data for the authenticated user; and a display unit coupled to the controller to display the real-time UVI value at the present time and the personal health instructions on UV protection for the authenticated user generated by the controller in the first mode based on the real-time UVI value at the present time and the historical UVI data.

Optionally, the monitoring apparatus further comprises a communication interface coupled to the controller and configured to pair the monitoring apparatus with a mobile terminal hosted by the authenticated user for data sharing and synchronization.

Optionally, the mobile terminal is configured to retrieve data from the memory including the real-time UVI value at the present time and one or more historical sets of UVI values and corresponding exposure times as the historical UVI data for the authenticated user and to process the data together with additional personal information about the authenticated user to generate updated data.

Optionally, the updated data comprises updated historical UVI data and updated personal health instructions on UV protection, the updated historical UVI data comprising one or more new sets of UVI values and corresponding exposure times added to the historical UVI data and being transferred via the communication interface for storing in the memory, the updated personal health instructions on UV protection being displayed on the mobile terminal in text.

Optionally, the display unit comprises a first panel around the authenticator for displaying the real-time UVI values in numerical digits with color code and a second panel separately for displaying the instructions on UV protection in text.

Optionally, the controller is further configured to enable a second mode for an anonymous user; and the memory is further configured to store the real-time UVI values over a period of exposure time for the anonymous user.

Optionally, the controller in the second mode is configured to send only the real-time UVI value at the present time accompanying general instructions on UV protection for the display unit to display.

Optionally, the case comprises a front cover assembled with a back cover; and the front cover is designed to allow the authenticator accessible and the display unit visible to the user.

Optionally, the detector comprises multiple UV light sensors mounted on the case including either the front cover or the back cover or both covers.

Optionally, the authenticator comprises one personal identification device selected from a finger print sensor, a voice recognition sensor, and a sound wave sensor.

Optionally, the memory is configured to store multiple sets of historical UVI data respectively for multiple authenticated users in a format of data base limited by memory size and add the real-time UVI value of the present time and a corresponding exposure time to the historical UVI data for the authenticated user currently using the monitoring apparatus.

Optionally, the monitoring apparatus further comprises a mounting fixture attached to the back cover, the mounting fixture being configured to be wearable on clothes.

Optionally, the mounting fixture comprises a clip having one end attached to the back cover and forming a V-shape slot between a body of the clip and the back cover and the body being used for optionally mounting another authenticator.

Optionally, the monitoring apparatus further comprises a user interface comprising one or more selection buttons and a confirmation button on the case for mode selection and user type confirmation.

In another aspect, the present invention provides a system for monitoring ultraviolet (UV) radiation to provide personal health instructions comprising a monitoring apparatus described herein paired through a digital link with a mobile terminal hosted by the authenticated user, the mobile terminal being configured to retrieve data stored in the memory of the monitoring apparatus including historical ultraviolet index (UVI) data associated with the authenticated user and process the data with additional personal information associated with the authenticated user to obtain updated data Optionally, the digital link comprises a wired link using via a communication interface coupled to the controller of the monitoring apparatus and configured with a USB port.

Optionally, the digital link comprises a wireless link via a communication interface coupled to the controller of the monitoring apparatus and configured with a short-range wireless communication technology.

Optionally, the updated data comprises updated historical UVI data and updated personal health instructions on UV protection, the updated historical UVI data comprising one or more new sets of UVI values and corresponding exposure times added to the historical UVI data and being transferred via the communication interface to the monitoring apparatus for storing in the memory, the updated personal health instructions on UV protection being displayed on the mobile terminal in text.

Optionally, the updated data comprises updated historical UVI data and updated personal health instructions on UV protection, the updated historical UVI data comprising one or more new sets of UVI values and corresponding exposure times added to the historical UVI data and being transferred via the communication interface to the monitoring apparatus for storing in the memory, the updated personal health instructions on UV protection being displayed on the mobile terminal in text.

In another aspect, the present invention provides a method for providing personal health instructions on ultraviolet (UV) radiation protection to a user, the method comprising authenticating the user to determine the user is one of an authenticated user and an anonymous user; based on a determination that the user is an authenticated user, the method further comprising measuring an intensity of UV radiation to generate an ultraviolet index (UVI) value at a present time; retrieving historical UVI data from a data base associated with the authenticated user; providing personal health instructions on UV radiation protection based on the UVI value at the present time and the historical UVI data; and displaying the UVI value at the present time.

Optionally, the method further comprises transferring the UVI value at the present time and historical UVI data to a mobile terminal hosted by the authenticated user; processing the historical UVI data with additional personal information in the mobile terminal to provide updated personal health instructions on UV radiation protection for the authenticated user; and transferring the updated historical UVI data to update the data base associated with the authenticated user.

Optionally, based on a determination that the user is an anonymous user, the method comprises measuring an intensity of UV radiation to generate an ultraviolet index (UVI) value at a present time; and displaying the UVI data at the present time.

Optionally, based on a determination that the user is an anonymous user, the method comprises collecting user identity information of the anonymous user; assigning a data base based on the user identity information; measuring an intensity of UV radiation to generate an ultraviolet index (UVI) value at a present time; and saving the UVI value at the present time and an exposure time to the data base.

Optionally, authenticating the user comprising identifying the user identity information by finger print or voice.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an apparatus for monitoring ultraviolet (UV) radiation to provide personal health instructions on UV protection, a system of a UV monitoring apparatus pairing with a mobile terminal for providing personal health instructions based on historical UVI data, and a method for providing personal UV protection instructions that substantially obviate one or more of the problems due to limitations and disadvantages of the related art. The present monitoring apparatus and system is capable of monitoring real-time UV radiation and systematically analyzing the UVI data at the present time and historical data to provide personal health instructions on UV radiation protection.

Figure 1:
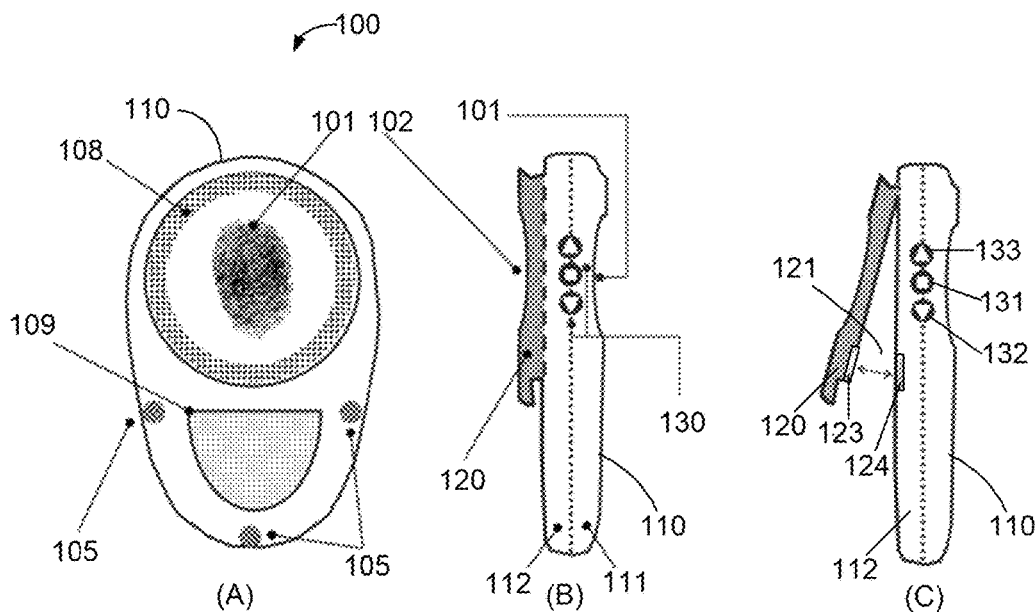
FIG. 1 is a schematic diagram of (A) a top view of an ultraviolet radiation monitoring apparatus, (B) a side view of the monitoring apparatus with a mounting clip in close position, and (C) a side view of the monitoring apparatus with a mounting clip in open position according some embodiments of the present disclosure.

In one aspect, the present disclosure provides a portable and wearable UV monitoring apparatus that is capable of providing personal health instructions on UV radiation protection. FIG. 1 is a schematic diagram of (A) a top view of an UV radiation monitoring apparatus, (B) a side view of the monitoring apparatus with a mounting clip in close position, and (C) a side view of the monitoring apparatus with a mounting clip in open position according some embodiments of the present disclosure. Referring to FIG. 1, viewed from a top view (A), the UV radiation monitoring apparatus 100 includes at least a case 110, an authenticator 101 for identifying a user to be an authenticated user or an anonymous user, a first display panel 108 disposed surrounding the authenticator 101 and a second display panel 109 disposed separately, e.g., at a position different from that of the first display panel 108, multiple UV detector sensors 105 visible from the top view and configured to detect UV radiations from multiple directions.

Referring to a side view (B) of FIG. 1, the case 110 of the monitoring apparatus 100 includes a front cover 111 and a back cover 112. The front cover 111 is configured to allow the authenticator 101, the first and second display panels 108 and 109 to be exposed to perform its authentication function for the convenience of the user. The back cover 112 is coupled with a mounting clip 120 for attaching the monitoring apparatus 100 to a target object. Optionally, the mounting clip 120 includes a back surface used for mounting a second authenticator 102 for supporting user identification. The front cover 111 and the back cover 112 are engaged together to form a cavity for holding functional components for supporting the authenticator 101, the first display panel 108, the second display panel 109, and multiple detector sensors 105 and other components of the monitoring apparatus 100. As seen in the side view, the monitoring apparatus 100 includes a user interface 130 for the user to provide operation instructions and responses to the user authentication results of authenticators 101.

Referring to another side view (C) of FIG. 1, the user interface 130 includes several control buttons including at least a confirmation button 131, one or more selection buttons 132 and 133. For example, the monitoring apparatus includes several working modes corresponding to different types of users or working environment, the selection button 132 or 133 allows the user to chose certain procedures in response to a result of what the user identification information collected by the authenticator 101. The confirmation button 131 allows the user to confirm a certain working mode being chosen or simply start or end an operation of the UV radiation monitoring apparatus for recording a latest result of UV radiation exposure subjected to the user. Referring to this side view again, the mounting clip 120 has one end being attached to the back cover 112, allowing it to swing from a close position that is in touch with the back cover 112 to an open position that forms a V-shape slot 121 for facilitating it to be mounted to a target object. Optionally, the monitoring apparatus 100 is a wearable device that can be easily carried by a person on his/her apparel such as necklace, wrist band, arm clip, belt, or badge. The mounting end of the mounting clip 120 can include a spring member to keep it relatively tightly in touch the back cover 112 at the close position and yet it operable to turn it into the open position. Optionally, two magnet members 123 and 124 can be respectively installed to inner surface of the mounting clip 120 and opposing surface of the back cover 112 for further holding the two surfaces together when the mounting clip 120 is in the close position.

Optionally, the multiple UV detector sensors 105 are disposed in different locations on the case including both the front cover 111 and the back cover 112 so that the UV detector can be more efficient in detecting the UV radiation coming from different angles to allow more accurate measurement of the UV light intensity that the user is exposed.

Figure 2:
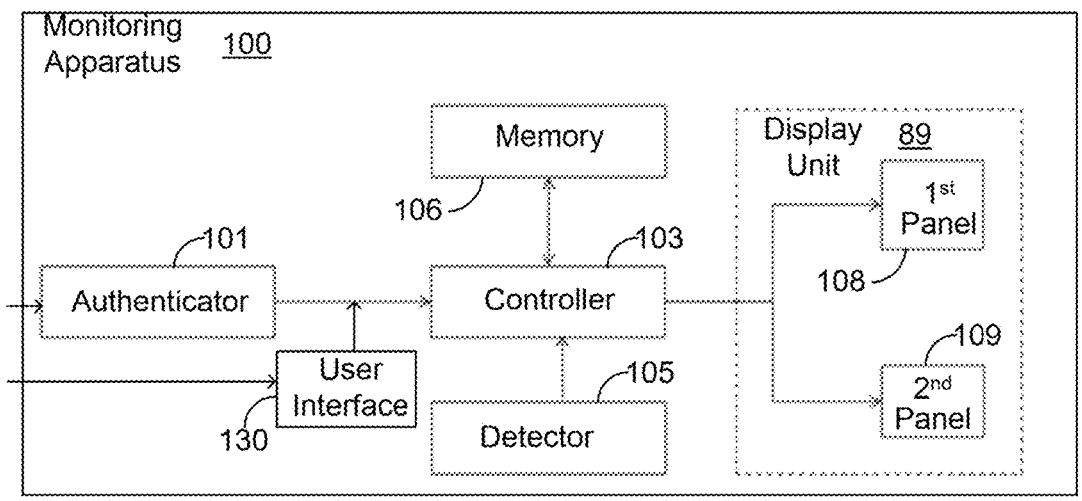
FIG. 2 is a functional diagram of an apparatus for monitoring UV radiation and providing personal health instructions on UV protection according to some embodiments of the present disclosure.

FIG. 2 is a functional diagram of an apparatus for monitoring UV radiation and providing personal health instructions on UV protection according to some embodiments of the present disclosure. Referring to FIG. 2, in one of some embodiments, some functional components of the monitoring apparatus 100 are disclosed. In the embodiment, the monitoring apparatus 100 includes an authenticator 101 with partial exposure on the front cover 111 of a case 110 (see FIG. 1) for collecting user identity information. The monitoring apparatus 100 further includes a controller 103 coupled to the authenticator 101 to process the user identity information for determining whether a user is an authenticated user or an anonymous user. Optionally, the authenticator 101 can be a finger print collector or sensor for collecting finger print image or digital map. Optionally, the authenticator 101 is a voice sensor for collecting a passage of human voices. Optionally, the authenticator 101 is a sound sensor configured to detect a special sound spectrum generated by the user.

Referring to FIG. 2, the monitoring apparatus 100 also includes a memory 106 coupled to the controller 103. The memory stores multiple user identity information respectively loaded for different authenticated users. The controller 103 is configured to compare the just-collected user identity information with the user identity information pre-stored in the memory 106 to determine whether the current user is an authenticated user. In an embodiment, if the user identity information collected by the authenticator 101 is matched with the user identity information stored in the memory 106, the controller 103 is enabling a first working mode, e.g., an authenticated mode for the user as an authenticated user to operate the monitoring apparatus 101. The authenticated mode is enabling the controller 103 an access of a data base in the memory 106 associated with the authenticated user. Optionally, the data base is configured to store historical UV radiation exposure data and current UV radiation data for the authenticated user. Optionally, the memory 106 includes sufficient large size for establishing multiple data bases for multiple authenticated users. In another embodiment, if the user identity information collected by the authenticator 101 is not matched with any user identity information stored in the memory 106, the controller 103 is enabling a second working mode, e.g., an anonymous mode, for the user as an anonymous user to operate the monitoring apparatus 100. In the second mode, the controller 103 does not link to any data base associated with an authenticated user.

Referring to FIG. 2 again, the monitoring apparatus 100 includes a UV detector 105 including multiple UV radiation sensors disposed at multiple locations on either the front cover 111 or the back cover 112 or both (see FIG. 1). The UV detector 105 is configured to measure intensity of UV radiation applied onto the monitoring apparatus which is equivalent to a measurement of UV radiation exposure subjected to the user. In some embodiments, the UV detector 105 is configured to measure real-time UV light intensity at a present time. The UV detector 105 is coupled to the controller 10 so as to pass the measured UV light intensity to the controller 103 for generating a real-time ultraviolet index (UVI) value converted from the UV light intensity. At the same time, the controller 103 is configured to turn on a timer to measure UV exposure time of a current UV exposure event from start to a present time. A profile of UVI values with corresponding exposure time for the current event will be saved as a piece of UVI data being added to historical UVI data in the memory 106 for future use.

Referring to FIG. 2, the monitoring apparatus 100 further includes a display unit 89 coupled to the controller 103 to receive at least the real-time UVI value at the present time from the controller 103 for displaying the UVI value on a first display panel 108. Optionally, the first display panel 108 includes a circular shape to surround the authenticator 101. The UVI value is shown in numerical digits at least in part of the circular shape first display panel 108. Optionally, the first display panel 108 is configured to show different colors respectively coded with different ranges of UVI values to provide meaningful warnings. For example, for UVI values in a range of 0.0-2.9, the displayed color is green referring to "low" risk of harm from unprotected sun exposure. For UVI values in a range of 3.0-5.9, the displayed color is yellow for indicating moderate risk. UVI values in a range of 6.0-7.9 correspond to orange color for indicating high risk. UVI values in a range of 8.0-10.9 corresponds to very high risk with red color indicator. UVI of 11.0 and above corresponds to extreme risk with violet color indicator.

In an embodiment, the display unit 89 includes a second display panel 109 coupled to the controller 103 for displaying various personal health instructions on UV protection provided only when the monitoring apparatus 100 is working under the authenticated mode by an authenticated user.

The personal health instructions on UV protection are generated based on the measured UVI value at the present time and historical UVI data stored in a data base associated with the authenticated user in the memory 106. The historical UVI data includes UVI values and corresponding exposure times at various environment conditions recorded at some historical periods of time for the particular user. Environment conditions include places with different altitudes, with different reflective surfaces like snow, water, sand or concrete, with different angles to the horizontal. Different persons with different natural skin colors or different ages or special requirements on UV exposure can receive different personal health instructions.

Referring to FIG. 2 again, the monitoring apparatus 100 also includes a user interface 130 coupled to the controller 103 and configured to receive user's inputs including certain operation instructions or responses to authentication results of the authenticator 101. In an embodiment as shown in FIG. 1, the user interface 130 includes one or more selection buttons 132, 133 and a confirmation button 131. The selection buttons can receive user's selection instruction for operating the monitoring apparatus to provide a target health plan on UV protection and send the selection instruction to the controller 103. The confirmation button can receive user's confirmation instruction for operating the monitoring apparatus to provide a target health plan on UV protection and send the confirmation instruction to the controller 103. For example, the user interface 130 may be used for a user to select and confirm if he/she wants to establish an authenticated user account when the user identification information collected by the authenticator 101 fails to match any one pre-stored in the memory 106. The user can select to stay as an anonymous user to operate the monitoring apparatus 100 as merely monitoring UVI value at the present time. Alternatively, the user may select to start establishing a new data base as an authenticator user to operate the monitoring apparatus 100 for providing UVI value at the present time as well as establishing a first historical UVI data starting from the present time by recording a profile of UVI values with a corresponding exposure time at the present location. This first historical UVI data will be saved in the data base associated with the newly authenticated user and used for generating personal health instructions on UV protection being displayed on the second panel 109. This first historical UVI data saved at this event can be retrieved in any future event by the controller 103 to generate personal health instructions on UV protection together with a real-time UVI value obtained in the future event.

Figure 3:
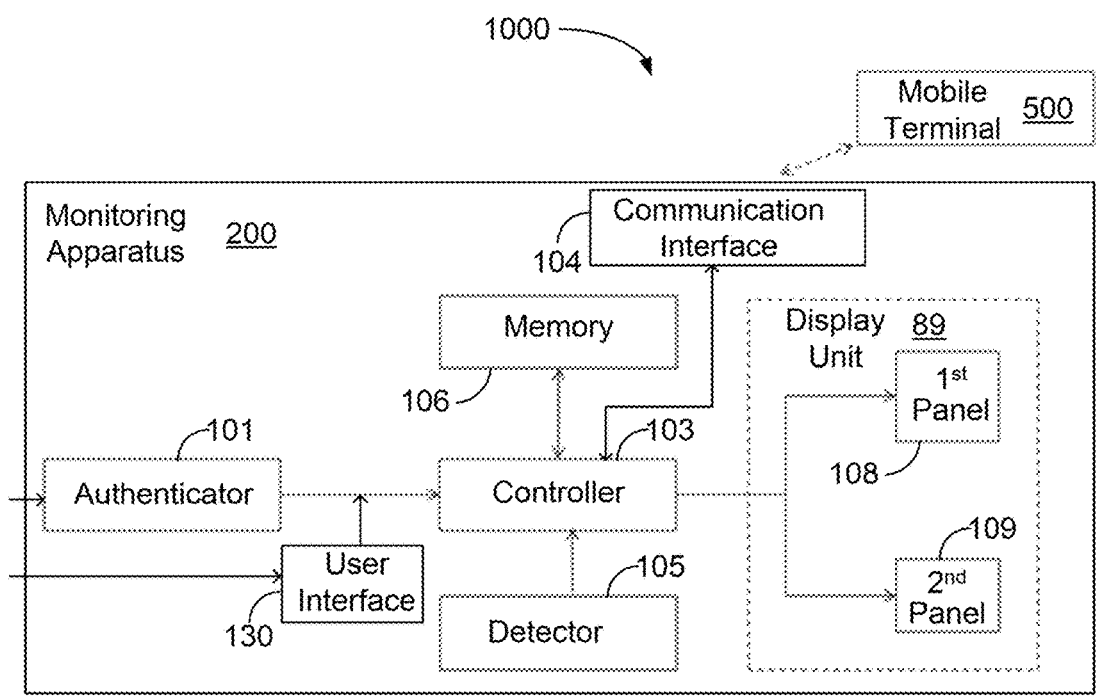
FIG. 3 is a functional block diagram of a system for providing personal health instructions on UV radiation protection according to some embodiments of the present disclosure.

FIG. 3 is a functional block diagram of a system for providing personal health instructions on UV radiation protection according to some embodiments of the present disclosure. Referring to FIG. 3, the system 1000 includes a monitoring apparatus 200 configured to monitor UV radiation for an authenticated user and to be paired with a mobile terminal 500 hosted by the authenticated user to generate updated personal health instructions on UV protection. The monitoring apparatus 200 is substantially the same as the monitoring apparatus 100 (of FIG. 2) working in an authenticated mode, i.e., operated by a user whose identity information collected by the authenticator 101 is determined by the controller 103 to be fully matched with a pre-stored user identity information in the memory 106. A user data base in the memory 106 associated with the authenticated user now is openly accessible. Once a current UV radiation monitoring event starts, a real-time UV light intensity that the subjected monitoring apparatus 200 currently exposed is measured by a UV detector 105 installed thereof and is used to generate a UVI value at the present time by the controller 103. The monitoring apparatus 200 further includes a first display panel 108 of a display unit 89 for directly displaying the UVI value at the present time. The controller 103 further retrieves historical UVI data from the data base associated with the authenticated user in the memory 106. Based on both the UVI value at the present time and retrieved historical UVI data, the controller 103 is configured to provide personal health instructions on UV radiation exposure and protection and use a second display panel 109 of the display unit 89 to provide the instructions in text.

Referring to FIG. 3, the monitoring apparatus 200 further includes a communication interface 104 configured to link the monitoring apparatus 200 with a mobile terminal 500 that is hosted by the authenticated user. Optionally, the mobile terminal 500 is a smart phone. Optionally, the mobile terminal 500 is a tablet computer. Optionally, the mobile terminal 500 is a notebook computer. The communication interface 104 can be configured to provide either a wired connection or wireless connection with the mobile terminal. For example, the wired connection can be realized by a USB cable connected to two ports respectively in the monitoring apparatus 200 and the mobile terminal. Alternatively, the wireless connection can be realized through a short-range wireless communication network including WiFi, Zigbee, Bluetooth, and many other available technologies. The mobile terminal 500 is hosted by the same authenticated user for the monitoring apparatus 200 so that all data in the data base associated with the authenticated user in the memory 106 of the monitoring apparatus 200 can be backed up to the mobile terminal 500. At the same time, the data base associated with the authenticated user in the monitoring apparatus 200 can be synchronized with any new personal data in the mobile terminal 500.

In some embodiments, the mobile terminal 500 is configured to retrieve all historical UVI data in the data base associated with the authenticated user in the monitoring apparatus 200 and process the retrieved historical UVI data together with any new personal information in the mobile terminal related to UV radiation exposure and personal health. Optionally the mobile terminal 500 is configured to generate updated personal health instructions on UV exposure and protection by processing the UVI value at the present time and the historical UVI data retrieved from the monitoring apparatus 200, and additional information stored in the mobile terminal 500 including location information with local altitude and bright surface (sand, water, snow, etc.) conditions and particularly personal health information special for the authenticated user or alternative historical UVI data for the authenticated user but not saved in the monitoring apparatus 200.

Optionally, the mobile terminal 500 is configured to display the updated personal health instructions on UV exposure and protection in text. The personal health instructions on UV protection include recommended minimum exposure time, allowed maximum exposure time, application of a broad-spectrum sunscreen with sun-protection-factor (SPF) in certain level, and suggestion on seeking shade or wearing sun protective clothing, wide-brimmed hat, and UV-blocking sunglasses. For example, if the UVI value of the present time is 8, a maximum exposure time is 30 minutes and could be cut to 10 minutes if the user has been exposed before as indicated by the historical UVI data and a broad-spectrum sunscreen with SPF level in 15~30 is recommended to be applied every 2 hours.

Optionally, the data base associated with the authenticated user in the memory 106 of the monitoring apparatus 200 can be updated after the mobile terminal 500 processes the combined data in original data base and an alternate data base assigned to the same authenticated user. An updated historical UVI data will be saved in the memory 106 of the monitoring apparatus 200. Optionally, the monitoring apparatus 200 can also display the updated personal health instructions on UV protection that is obtained based on the updated historical UVI data and a UVI value at the present time measured by the UV detector 105 thereof.

Optionally, the monitoring apparatus 200 also includes a user interface 130 configured to establish a new authenticated user data base in the memory 106 and make a link to the mobile terminal 500 of the system 1000. The mobile terminal 500 is hosted by the same new authenticated user to back up a first piece of historical UVI data obtained in the current UV exposure event by the monitoring apparatus 200.

Figure 4:
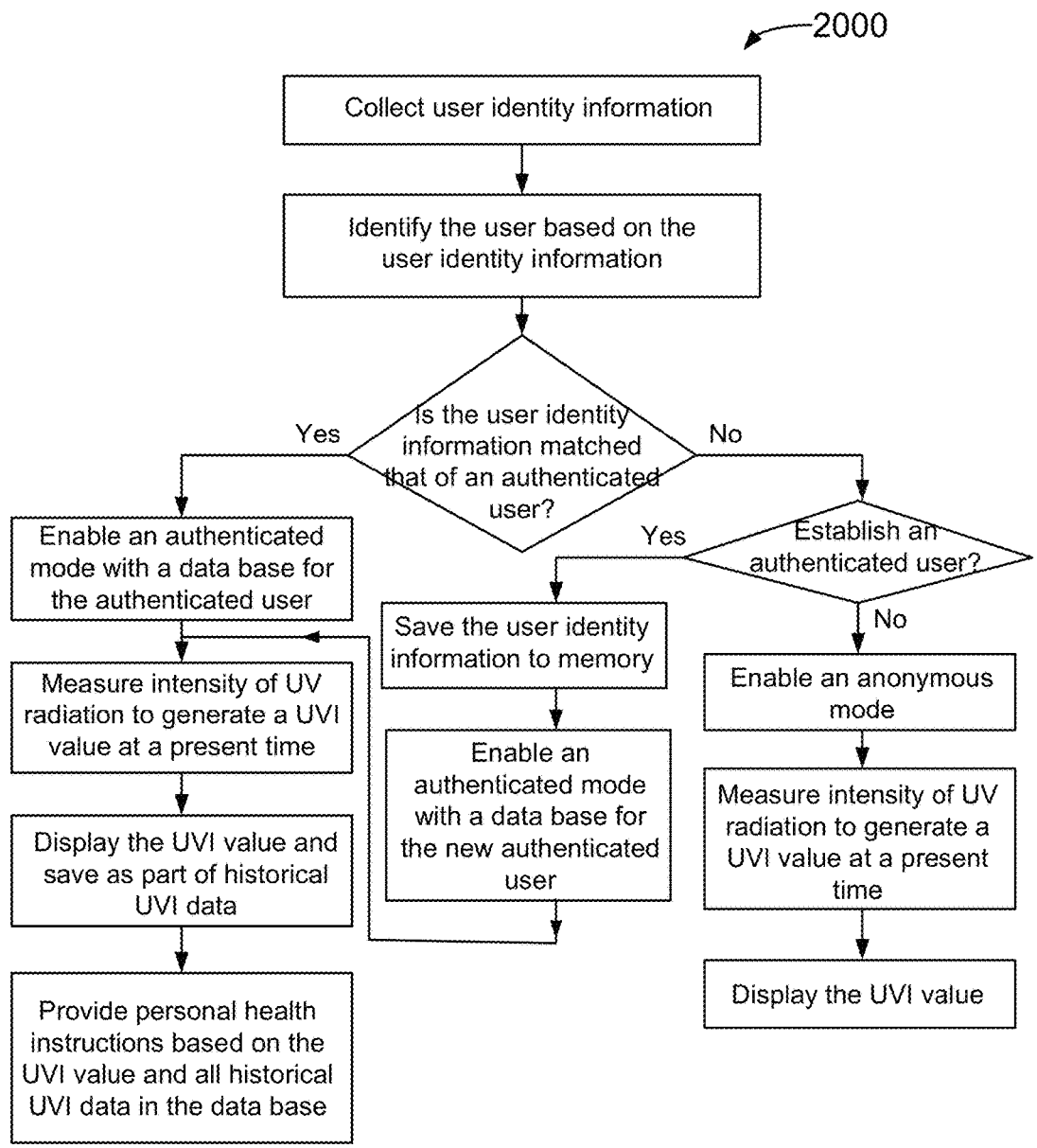
FIG. 4 is a flow chart showing a method of monitoring ultraviolet radiation for providing personal health instructions on UV protection according to some embodiments of the present disclosure.

In another aspect of the present disclosure, a method of providing personal health instructions on UV exposure and protection based on results of monitoring UV radiation at the present time as well as monitoring historical UVI data of an authenticated user. FIG. 4 is a flow chart showing a method of monitoring ultraviolet radiation for providing personal health instructions on UV protection according to some embodiments of the present disclosure. Referring to FIG. 4, the method 2000 starts with a step of collecting user identity information. Optionally, user's finger print, voice, or special sound can be collected as the user identity information for establishing an authenticated user to receive personal health instructions. For example, as shown in FIG. 1, one or more authenticators are used to collect user identity information. Optionally, the user identity information is collected as an image, or voice spectrum, or sound frequency profile. Optionally, the user identity information is in a digital format.

Referring to FIG. 4, the method 2000 further includes a process of identifying the user based on the collected user identity information. Optionally, the user identity information in digital format is processed by a controller which is configured to compare the collected user identity information with one user identity information in multiple data bases pre-stored in a memory. Each data base is assigned to one of multiple authenticated users. The comparison above leads to a process of determining whether the user identity information matched that of an authenticated user. If the user identity information matches that pre-stored for an authenticated user, an authenticated mode is enabled and a particular data base is assigned to the authenticated user for storing all user-specific data. Optionally, the data base has stored historical data specifically associated with the authenticated user which is now retrievable by a controller or utilized for providing personal health instructions for a current event. Optionally, the data base can be updated by saving newly acquired data for the current event on top of the historical data which can be utilized for any future event.

Referring to FIG. 4 again, the method 2000 includes a process of measuring intensity of UV radiation exposing to the authenticated user. The intensity of UV radiation is then used to generate a UVI value. Optionally, the intensity of UV radiation can be measured by multiple UV sensors aiming to different directions to measure both UV radiation exposures directly from sun light and indirectly from reflections of bright surfaces nearby. A UVI value at the present time is generated by converting a real-time UV intensity value based on a standard UVI definition. The UV of greatest concern for causing sunburn occupies a spectrum of wavelength primarily from 295 to 325 nm. Skin damage from sunburn, however, is related to wavelength, the shorter wavelengths being much more damaging. Therefore, weighting factors are introduced for properly taking consideration of the wavelength-dependent UV damage measurement. An integrated UV intensity is obtained using all the intermediate weighting factors over the full spectral range of 290 nm to 400 nm. Then the integrated UV intensity (in unit of $mW/m^2$) is divided by 25 $mW/m^2$ to give a UV Index (UVI) value.

Referring to FIG. 4, the method 2000 includes a process of displaying the UVI value obtained real-time in a current UV exposure event and saving the UVI value at the present time to the data base. Optionally, the UVI value at the present time is added on top of a historical UVI data existed in the data base associated with the authenticated user. The historical UVI data includes at least a set of UVI values and corresponding exposure time. As the UVI value at the present time plus a latest exposure time associated with the current UV exposure event is added in the data base, an updated historical UVI data is obtained and saved. Optionally, the historical UVI data also contains information related to location and environment information about where a particular UVI value was obtained during a past UV exposure event.

Referring to FIG. 4 again, the method 2000 further includes a process of providing personal health instructions on UV protection based on the UVI value at the present time and the updated historical UVI data in the data base. Optionally, this process is performed by displaying the personal health instructions on UV protection in text on a display panel.

Referring back to the process of determining whether the user identity information matched that of an authenticated user, if the user identity information is determined not matching that pre-stored for an authenticated user the method 2000 includes a selection process for the user to decide to be established as an authenticated user or not. If the user selects not to be established as an authenticated user, the method 2000 includes a step of enabling an anonymous mode for the user. Optionally, the selection process is performed by a user interface coupled to a controller to send user instruction thereof. Optionally, the user interface is configured to allow the user to confirm to enter the anonymous mode. Subsequently, the method 2000 includes a process of measuring intensity of UV radiation exposing to the user under the anonymous mode. The intensity of UV radiation is then used to generate a UVI value at the present time. This process is substantially the same for the authenticated user. Finally, the method 2000 includes a process of displaying the UVI value at the present time. Optionally, this process is performed by displaying the UVI value on a display panel. Optionally, the UVI value is directly displayed as digit numerals. Optionally, the UVI value is displayed in certain color coded based on which specific range of the measured UVI value falls in.

If the user selects to be established as an authenticated user, the method 2000 includes a step of saving the collected user identity information into a memory to establish a data base associated with the authenticated user. Optionally, the user interface is configured to receive selection instruction and send to the controller. The controller is to perform the step of saving the collected user identity information into a memory based on the selection instruction. Optionally, the user interface allows the user to confirm to log in as a (new) authenticated user. Subsequently, the method 2000 includes several processes that at substantially the same as those for all authenticated users: measuring intensity of UV radiation to generate a UVI value at a present time; displaying the UVI value and saving the UVI value with corresponding exposure time as part of historical UVI data; and providing personal health instructions on UV protection based on the UVI value at the present time and all historical UVI data in the data base associated with the (new) authenticated user.

Figure 5:
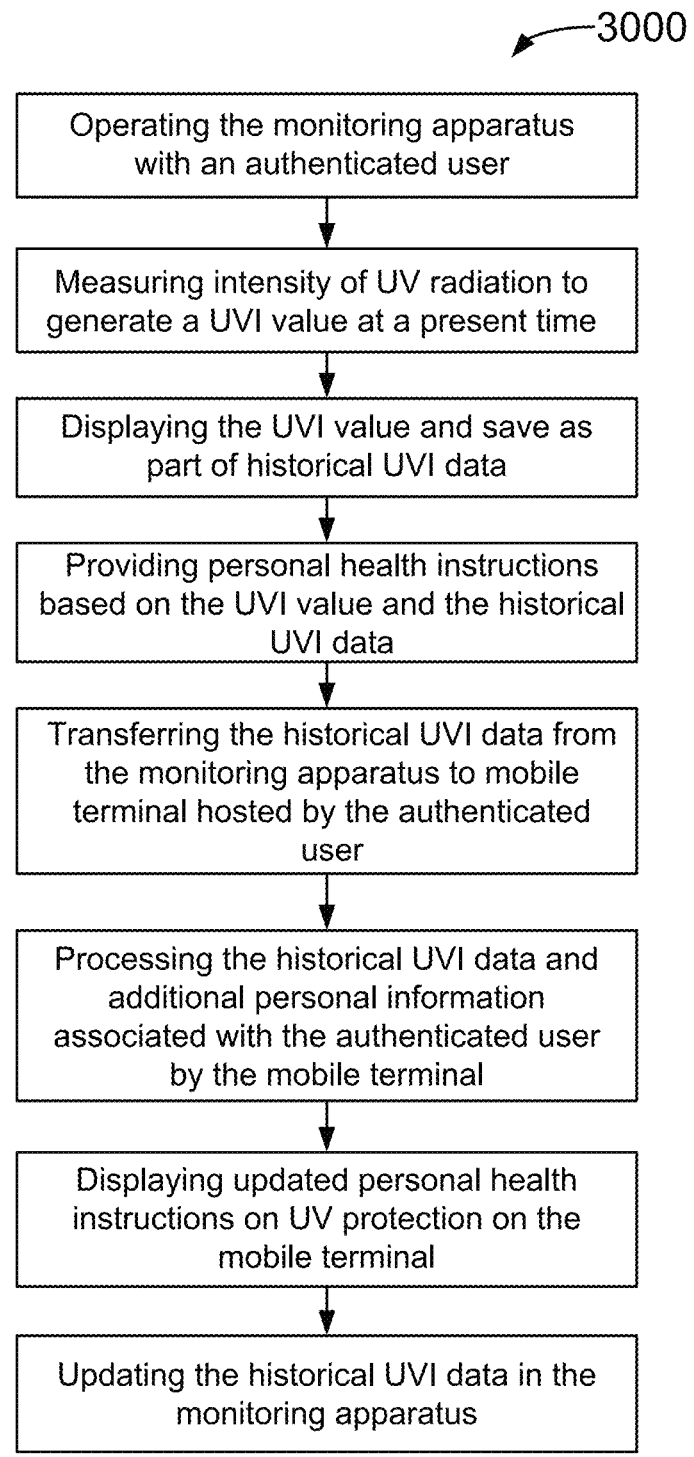
FIG. 5 is a flow chart showing a method of pairing the monitoring apparatus with a mobile terminal to provide personal health instructions on UV protection according to some embodiments of the present disclosure.

In an alternative aspect, the present disclosure provides a method of providing updated personal health instructions on UV protection by pairing the monitoring apparatus with a mobile terminal. FIG. 5 is a flow chart showing a method of pairing the monitoring apparatus with a mobile terminal to provide updated personal health instructions on UV protection according to some embodiments of the present disclosure. In some embodiments, the monitoring apparatus is a UV monitoring apparatus 200 of FIG. 3 configured in an authenticated mode and the mobile terminal is a smart device including a smart phone, a tablet computer, or a laptop computer. Optionally, the mobile terminal is a cloud computer or data center computer.

Referring to FIG. 5, the method 3000 starts with operating the monitoring apparatus in an authenticated mode. Optionally, the monitoring apparatus includes one or more authenticators for collecting user identity information and at least a controller for determining that the collected user identity information is matched with that of one authenticated user stored in a memory of the monitoring apparatus. Optionally, the authenticator is a finger print image collector, or a voice recognition device, or a sound frequency matcher. Optionally, the controller is a device configured to compare the user identity information in digital format with recorded digital ID. Optionally, the controller is configured to couple with a user interface to accept user's confirmation instruction to enter the authenticated mode.

The method 3000 further includes a process of measuring intensity of UV radiation in real time to generate a UVI value at a present time. Optionally, this process is performed by operating the monitoring apparatus to use multiple UV sensors mounted on different locations of the monitoring apparatus for detecting UV radiations from different angles including both direct exposure from sun and indirect reflection from surrounding bright surfaces. Optionally, the controller is used a pre-programmed algorithm to convert the intensity value integrated over the full spectral range of 290 nm to 400 nm with several weighting factors at specific wavelengths to a UV Index (UVI) value commonly used for UV protection. Optionally, the controller is configured to record an exposure time under the UVI value at the present time counted from a start time (when the user entering the authenticated mode) to a finish time (e.g., when the user is out of current UV exposure and/or turn off the monitoring apparatus).

The method 3000 additionally includes a process of displaying the UVI value at the present time and saving the UVI value at the present time and the corresponding exposure time as a latest historical UVI data into a memory. Optionally, the process of displaying is performed by a first display panel installed on the monitoring apparatus. The first display panel is coupled to the controller to receive the UVI value for displaying. Optionally, the first display panel is configured to convert the UVI value to a certain color pre-coded based on a specific range that the UVI value falls in. Optionally, the controller is configured to save the latest historical UVI data corresponding to a current UV exposure event into a data base assigned to the authenticated user. The latest historical UVI data will be added on top of any pre-existed historical UVI data corresponding to other previous UV exposure events. Combined both, an updated historical UVI data is saved in the data base assigned to the authenticated user.

Referring to FIG. 5, the method 3000 includes a process of providing personal health instructions on UV protection based on the UVI value at the present time and the updated historical UVI data. Optionally, the controller of the monitoring apparatus is configured to process data of the UVI value of the present time and historical UVI data associated with the authenticated user to provide personal health instructions on UV protection specific for the authenticated user. Optionally, the personal health instructions on UV protection specific for the authenticated user is displayed in text on a second display panel disposed on the monitoring apparatus. The second display panel is optionally separated from the first display panel.

Referring back to FIG. 5, the method 3000 subsequently includes a process of transferring the historical UVI data from the monitoring apparatus to a mobile terminal hosted by the authenticated user. In an embodiment, the process of transferring is executed after the monitoring apparatus establishes a data link with the mobile terminal. Optionally, the data link between the monitoring apparatus and the mobile terminal is a wired link through, e.g., a USB connection. Optionally, the data link is established via a wireless communication network based on one of short-range communication technologies such as WiFi, Zigbee, Bluetooth, etc. Optionally, the monitoring apparatus includes a communication interface for establishing the data link with or pairing with the mobile terminal and transferring data from the monitoring apparatus to the mobile terminal or receiving data from the mobile terminal. The present disclosure about the method of providing updated personal health instructions on UV protection by pairing the monitoring apparatus with a mobile terminal should not set any limits on the data link format above. The mobile terminal, as it is hosted by the authenticated user, is configured to retrieve all data stored in the data base associated with the same authenticated user. The data may include all historical UVI data recorded for one or more current or previous UV exposure events and any personal health information related to the authenticated user. The mobile terminal, however, may contain additional data related to the same authenticated user. Optionally, the process of transferring the historical UVI data is a backup process for keeping all data associated with the authenticated user in the monitoring apparatus to a safe place.

The method 3000 subsequently includes processing the historical UVI data and additional personal information associated with the authenticated user by the mobile terminal. Optionally, the mobile terminal provides a larger memory to handle much larger size of data including both the data retrieved from the monitoring apparatus and the additional data stored in the mobile terminal and a processor with greater CPU power to perform many additional analytic and logic calculations based on the larger size of data. Optionally, the mobile terminal is a computer configured to analyze a combined historical UVI data, to analyze local environmental information for each UV exposure events, to analyze personal health information in related to UV exposure specifically for the authenticated user. Optionally, processing the historical UVI data and additional personal information associated with the authenticated user is to generate updated personal health instructions on UV protection.

The method 3000 further includes displaying the updated personal health instructions on UV protection on the mobile terminal. Based on results of processing the historical UVI data and additional personal information associated with the authenticated user, the mobile terminal is configured to provide personal health instructions on UV protection that is updated from original personal health instructions displayed on the monitoring apparatus. Optionally, the mobile terminal includes a display panel to display these instructions in text. Optionally, these instructions are transferred or backed up to a personal health data base in the mobile terminal or in a cloud computer.

Referring to FIG. 5, the method 3000 includes updating the historical UVI data in the monitoring apparatus. After the mobile terminal generates the updated personal health instructions on UV protection, the mobile terminal is configured to send the combined historical UVI data back to the monitoring apparatus to update the data in the memory of the monitoring apparatus. Optionally, the historical UVI data in the data base associated with the authenticated user is updated. Optionally, all data in association with the authenticated user in the data base is synchronized with the data in the mobile terminal including those data just processed by the processor of the mobile terminal. Optionally, the updated personal health instructions on UV protection can be displayed on the second display panel of the monitoring apparatus.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of providing updated personal health instructions on UV protection, comprising:
    operating a monitoring apparatus in an authenticated mode, the monitoring apparatus comprising one or more authenticators for collecting user identity information and at least a controller for determining that collected user identity information matches with that of one authenticated user stored in a memory of the monitoring apparatus;
    measuring intensity of UV radiation by the monitoring apparatus in real time to generate an ultraviolet index (UVI) value at a present time;
    storing the UVI value at the present time and a corresponding exposure time as latest historical UVI data into a first memory of the monitoring apparatus;
    pairing the monitoring apparatus with a mobile terminal by establishing a wireless data link connection between the monitoring apparatus and the mobile terminal at a time point later than the present time;
    transferring the latest historical UVI data from the first memory of the monitoring apparatus to a second memory of the mobile terminal hosted by the authenticated user through the wireless data link connection; and
    processing the historical UVI data and additional personal information associated with the authenticated user by the mobile terminal.

2. The method of claim 1, further comprising:
    authenticating a user to determine the user is one of an authenticated user and an anonymous user;
    based on a determination that the user is an authenticated user, measuring an intensity of UV radiation to generate an ultraviolet index (UVI) value at a present time;
    retrieving historical UVI data from a data base associated with the authenticated user;
    providing personal health instructions on UV radiation protection based on the UVI value at the present time and the historical UVI data; and
    displaying the UVI value at the present time.

3. The method of claim 2, further comprising:
    transferring the UVI value at the present time and historical UVI data to a mobile terminal hosted by the authenticated user;
    processing the historical UVI data with additional personal information in the mobile terminal to provide updated personal health instructions on UV radiation protection for the authenticated user;
    generating an updated historical UVI data based on the UVI value at the present time and the historical UVI data; and
    updating the data base associated with the authenticated user with the updated historical UVI data.

4. The method of claim 2, further comprising, based on a determination that the user is an anonymous user, measuring an intensity of UV radiation to generate an ultraviolet index (UVI) value at a present time; and
    displaying the UVI data at the present time and saving the UVI value at the present time to a data base.

5. The method of claim 2, based on a determination that the user is an anonymous user, comprising:
    collecting user identity information of the anonymous user;
    assigning a data base based on the user identity information;
    measuring an intensity of UV radiation to generate an ultraviolet index (UVI) value at a present time; and
    saving the UVI value at the present time and an exposure time to the data base.

6. The method of claim 2, wherein authenticating the user comprises identifying user identity information by finger print or voice.

7. The method of claim 2, wherein authenticating the user comprises:

collecting user identity information; and compare collected user identity information with a stored user identity information.

8. The method of claim 1, further comprising displaying the UVI value at the present time on the monitoring apparatus.

9. The method of claim 1, further comprising saving the UVI value at the present time and a corresponding exposure time as latest historical UVI data into a memory.

10. The method of claim 1, further comprising generating an updated historical UVI data based on the UVI value at the present time and the historical UVI data; and providing personal health instructions on UV protection by the monitoring apparatus based on the UVI value at the present time and the updated historical UVI data.

11. The method of claim 1, wherein processing the historical UVI data and additional personal information associated with the authenticated user by the mobile terminal comprises one or a combination of:

analyzing a combined historical UVI data;

analyzing local environmental information for each UV exposure events; and analyzing personal health information in related to UV exposure specifically for the authenticated user.

12. The method of claim 1, subsequent to processing the historical UVI data and additional personal information associated with the authenticated user by the mobile terminal, further comprising generating updated personal health instructions on UV protection.

13. The method of claim 12, subsequent to generating updated personal health instructions on UV protection, further comprising displaying the updated personal health instructions on UV protection on the mobile terminal.

14. The method of claim 1, subsequent to processing the historical UVI data and additional personal information associated with the authenticated user by the mobile terminal, further comprising updating the historical UVI data in the monitoring apparatus.

15. The method of claim 14, subsequent to processing the historical UVI data and additional personal information associated with the authenticated user by the mobile terminal, further comprising generating a combined historical UVI data by the mobile terminal;

wherein updating the historical UVI data in the monitoring apparatus comprises transmitting the combined historical UVI data from the mobile terminal to the monitoring apparatus to update data in a memory of the monitoring apparatus.

16. The method of claim 14, wherein updating the historical UVI data in the monitoring apparatus comprises synchronizing all data in association with the authenticated user in a data base of the monitoring apparatus with the data in the mobile terminal.

17. The method of claim 1, further comprising identifying user identity information by finger print or voice thereby authenticating the user.

18. The method of claim 1, wherein the mobile terminal is a smart device.

19. The method of claim 1, wherein the mobile terminal is a cloud computer or a data center computer.

* * * * *